United States Patent
Mine et al.

(10) Patent No.: US 6,964,526 B2
(45) Date of Patent: Nov. 15, 2005

(54) OPTICAL PLUG AND OPTICAL CONNECTOR PROVIDED WITH THE OPTICAL PLUG

(75) Inventors: Keiji Mine, Osaka (JP); Hiroshi Nakagawa, Kyoto (JP)

(73) Assignee: Hosiden Corporation, Osaka (JP)

( * ) Notice: Subject to any disclaimer, the term of this patent is extended or adjusted under 35 U.S.C. 154(b) by 0 days.

(21) Appl. No.: 10/839,650

(22) Filed: May 4, 2004

(65) Prior Publication Data
US 2004/0223702 A1    Nov. 11, 2004

(30) Foreign Application Priority Data
May 7, 2003    (JP)    ............... 2003-128966

(51) Int. Cl.$^7$ ............................................... G02B 6/36
(52) U.S. Cl. ......................................... 385/78; 385/77
(58) Field of Search ................... 385/58–60, 70–72, 385/76–78, 139

(56) References Cited

U.S. PATENT DOCUMENTS 4,762,388 A * 8/1988 Tanaka et al. ............... 385/58
5,692,080 A * 11/1997 Lu ............................... 385/60

FOREIGN PATENT DOCUMENTS

| JP | 59140410 A | * 8/1984 | ............ G02B 7/26 |
| JP | 62139506 A | * 6/1987 | ............ G02B 6/38 |
| JP | 01021767 | 1/2001 | |
| JP | 01290046 | 10/2001 | |

* cited by examiner

Primary Examiner—Rodney Bovernick
Assistant Examiner—Omar Rojas
(74) Attorney, Agent, or Firm—David N. Lathrop, Esq.; Gallagher & Lathrop

(57) ABSTRACT

Ferrules are formed to extend from the bottom wall of a recess formed in a front face of an optical plug body such that forward ends of the ferrules are flush with or protrude forwardly of the front face. Forward ends of optical fibers inserted into the ferrules are exposed at forward ends of the ferrules. A ferrule cover is mounted in the recess for sliding over an outer periphery of the ferrules and is biased by a coil spring toward the front face. Movement of the ferrule cover in a forward direction is limited by pawls on the ferrules and locking projections on the body. The ferrule cover has a stop member adapted to abut against a shoulder formed at a window in a peripheral wall of the recess when the ferrule cover is moved in a rearward direction to prevent the ferrule cover from moving beyond a locking position. The forward face of the ferrule cover is positioned forward of forward ends of the ferrules when the ferrule cover is positioned at a locking position to protect the forward ends of the optical fibers. A hinge with a protrusion is provided, and locking by the stop member is released by depression of the protrusion, so the ferrule cover can move rearward to expose forward ends of the ferrules for easily fitting into sleeves of a receptacle.

11 Claims, 8 Drawing Sheets

OPTICAL PLUG AND OPTICAL CONNECTOR PROVIDED WITH THE OPTICAL PLUG

BACKGROUND OF THE INVENTION

1. Field of the Invention

This invention relates to an optical plug for attachment to terminal ends of optical fibers and an optical connector comprising the optical plug and a receptacle mated and connected with each other.

2. Prior Art

FIGS. 11A and 11B illustrate an example of the conventional construction of such optical plug (see Japanese Patent Application Publication No. 2001-21767, for example), FIG. 11A being a plan view while FIG. 11B is a side view, partly in cross-section taken along the line 11B–11B' in FIG. 11A. This optical plug 10 includes a body 20 and a tubular main cover 30 slidably mounted over the body 20 with an optical fiber cable 40 inserted into the body from the rear face thereof.

The body 20 is formed in its front face 20a with a recess 21, from the bottom wall 21 a of which ferrules (tubular members) 22 are formed to protrude in a forward direction. The face 20a of the body confronting the receptacle will be referred to as "front face" hereinafter. The term "forward direction" as well as the term "forward" or "forwardly" mean hereinafter a direction from the rear face toward the front face of the body, so that the direction opposite to the forward direction is also referred to hereinafter the term "rearward direction" as well as the term "rearward" or "rearwardly". In this example, two ferrules 22 are disposed in juxtaposition with their forward ends 22a extending forwardly by a length L1 of the front face 20a of the body 20.

The optical fiber cable 40 is introduced through a rear end opening 30b of the cover 30 into the body 20 with the two optical fibers (optical fiber cores) 42 having their claddings 41 stripped off being inserted into the respective ferrules 22 with the forward ends 42a of the fibers flush with the forward ends 22a of the ferrules 22 and exposed. The reference number 50 in FIG. 11B indicates a retainer adapted to bite into the claddings 41 to fix the optical fibers 42 in place.

The body 20 is further formed on the top surface thereof adjacent its forward end with a locking protrusion 23 such that upon the optical plug 10 being inserted into the opening of a mating receptacle (not shown), a locking piece provided in the receptacle is engaged with the locking protrusion 23 to prevent withdrawal of the optical plug 10 and maintain it in mating connection with the receptacle. The optical plug and the receptacle thus form an optical connector.

Additionally, the cover 30 has a pair of actuator pieces 31 extending from the forward end 30a thereof on the opposite sides of the locking protrusion 23 (see FIG. 11A) and the actuator pieces 31 are formed on their opposing inside surfaces with mountain-like (trapezoidal) projections 32.

These projections 32 constitute the dissolving means for dissolving the engagement of the locking protrusion 23 of the body 20 with the locking piece of the receptacle when withdrawing the optical plug 10 from the receptacle. More specifically, when withdrawing the optical plug 10 from the receptacle, the cover 30 mounted over the body 20 is first slidingly moved rearwardly relative to the body 20, that is, in the direction of withdrawal whereby the locking piece wider than the locking protrusion 23 is forcedly lifted up by the pair of projections 32 out of engagement with the locking protrusion 23 to permit the withdrawal of the optical plug 10 from the receptacle.

It is to be noted here that when the optical plug 10 is mated with the receptacle, the pair of ferrules 22 are each fitted into a corresponding one of a pair of sleeves disposed in the opening of the receptacle whereby the optical fibers 42 are positioned in place to insure good optical connection.

As discussed above, the prior art optical plug 10 includes the ferrules 22 mating with the sleeves of the receptacle, the terminal ends of the optical fibers 42 being inserted and held in the ferrules 22 with the forward ends 42a of the fibers flush with the forward ends 22a of the ferrules 22 and the ferrules and fibers projecting barely forwardly of the front face 20a of the body 20.

Due to this, there was a possibility that the fiber ends 42a might be damaged or otherwise impaired during the handling of the optical plug 10, resulting in an increase in the optical coupling loss and hence deterioration in the performance.

In view of this, in the optical plug of such type, it has been proposed that a protective cap be provided so that it may be fitted over the forward ends of the fibers to protect them when the plug is in the unmated state (not in mating engagement with the receptacle) (see Japanese Patent Application Publication No. 2001-290046, for example).

However, in the system in which a protective cap be provided separately from the optical plug so that the fiber ends may be to protected from being damaged by fitting the cap over the fiber ends, the operation of attaching and detaching the protective cap was required when inserting and withdrawing the optical plug into and from the receptacle. In addition, such operation was also required during the inspection step, for example of the manufacturing process and found troublesome and time-consuming.

Furthermore, such protective cap had the drawback of being vulnerable to loss because it was separate from the optical plug.

SUMMARY OF THE INVENTION

In view of the situation described above, an object of the present invention is to provide an optical plug which is configured such that the forward ends of the optical fibers are protected to prevent possible damages thereto when the plug is in the unmated state, without the need for the troublesome operation of attaching and detaching the protective cap as is the case with the prior art.

Another object of the present invention is to provide a novel optical connector comprising an optical plug and a receptacle mated with each other in which the optical plug is configured so that it may be mated with the receptacle in such a manner as to prevent possible damages to the forward ends of the optical fibers.

The optical plug according to the present invention which is usable in engagement with a receptacle comprises an optical plug body having a recess formed in its front face opposing to the receptacle and ferrules formed to extend from a bottom wall of the recess such that forward free ends of the ferrules are flush with or protrude forwardly of the front face of the body, optical fibers inserted into the ferrules such that forward ends of the fibers are flush with and exposed at the forward ends of the ferrules, a ferrule cover mounted in the recess capable of sliding movement along outer periphery of the ferrules in both a forward direction from the bottom wall of the recess toward the front face of the body and a forward direction opposite to the forward direction; spring means for urging the ferrule cover to move in the forward direction from the bottom wall of the recess; withdrawal-preventing means for preventing the ferrule cover from its movement in the forward direction beyond a predetermined withdrawal-preventing position when the ferrule cover is urged to move in the forward direction by the spring means; locking means for preventing the ferrule cover from its movement in the rearward direction toward the bottom wall of the recess beyond a locking position which coincides with the withdrawal-preventing position or which is near the withdrawal-preventing position when the ferrule cover is urged to move in the rearward direction from the withdrawal-preventing position toward the bottom wall of the recess against a biasing force of the spring means, so that a forward face of the ferrule cover is positioned forwardly of the forward ends of the ferrules while the ferrule cover is positioned at the withdrawal-preventing position or the locking position to thereby protect the forward ends of the ferrules; and releasing means for releasing the locking action of the locking means so that the ferrule cover is allowed to move in the rearward direction beyond the locking position in the recess toward the bottom wall thereof, whereby the forward ends of the ferrules are exposed out of the forward face of the ferrule cover.

The optical connector according to the present invention comprises the optical plug according to the present invention set forth hereinabove, a receptacle adapted to mate with the optical plug, and connecting means for connecting the optical plug and the receptacle with each other; wherein the receptacle having an opening for receiving the body of the optical plug to be inserted therein includes sleeves formed in the opening for mating with the ferrules of the optical plug, and moving means adapted to be engaged with the ferrule cover for moving the ferrule cover along the ferrules of the optical plug in the rearward direction in the recess toward the bottom wall thereof when the body of the optical plug is inserted into the opening and the releasing means of the optical plug is actuated, whereby the forward ends of the ferrules are exposed to project forwardly of the forward face of the ferrule cover, and in accordance with insertion of the body of the optical plug into the opening the sleeves are mated over the thus projected forward ends of the ferrules.

The optical connector according to the present invention further comprises dissolving means for inactivating the connecting means to thereby dissolve the engagement between the optical plug and the receptacle.

BRIEF DESCRIPTION OF THE DRAWINGS

FIGS. 4A and 4B are perspective views illustrating the cross-sectional construction of the optical plug shown in FIG. 1, FIG. 4A showing that portion of the plug containing the optical fiber while FIG. 4B shows the central portion (coil spring portion) of the plug;

FIGS. 5A and 5B are perspective views illustrating the optical plug shown in FIG. 1 and the mating receptacle, FIG. 5A showing the optical plug as viewed from the front end thereof while FIG. 5B shows the optical plug as viewed from the real end thereof;

FIGS. 8A and 8B are perspective views illustrating the cross-sectional construction of the optical plug and the receptacle mated with each other for optical connection, FIG. 8A showing the central portion thereof while FIG. 8B shows the fiber/sleeve portion;

BEST MODES FOR CARRYING OUT THE INVENTION

Figure 11A:
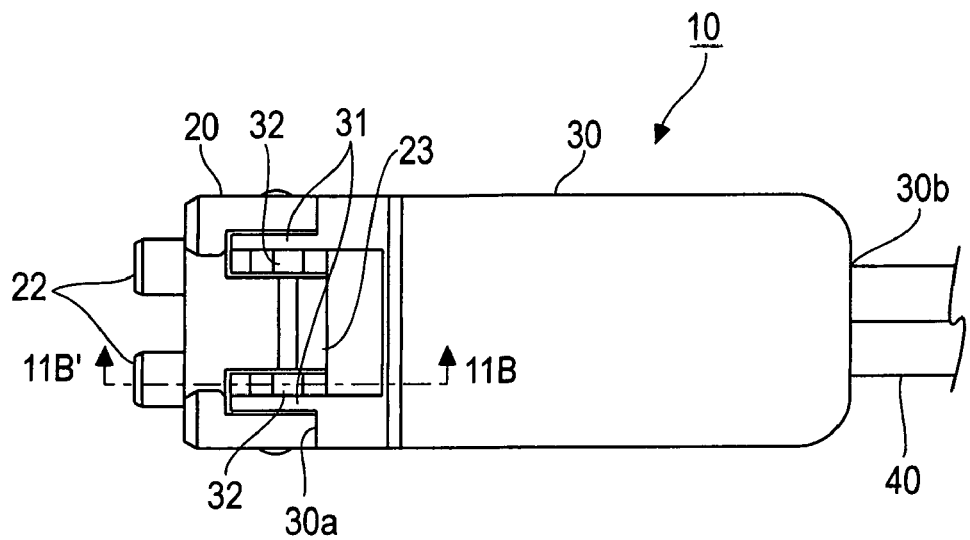
FIG. 11A is a plan view illustrating an example of the prior art optical plug.
Figure 11B:
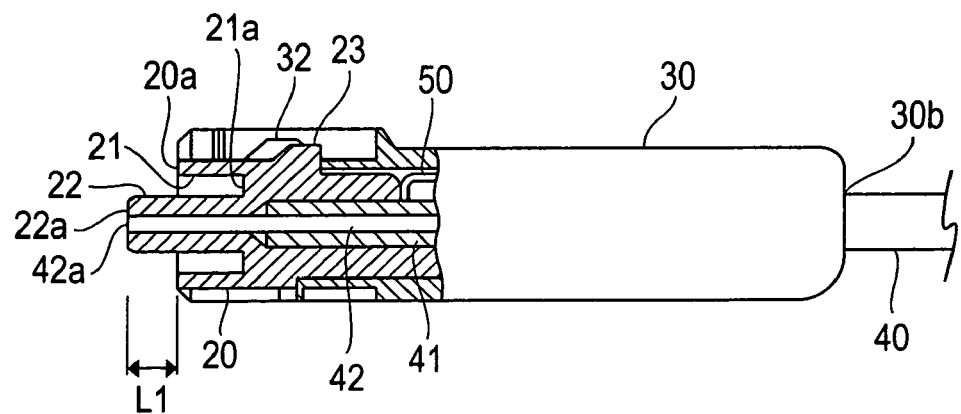
FIG. 11B is a partly cross-sectional view.

The embodiments of the present invention will be described below with reference to the accompanying drawings in which the parts corresponding to those shown in FIG. 11 are indicated by like reference numerals and will not be discussed again in detail.

Figure 1A:
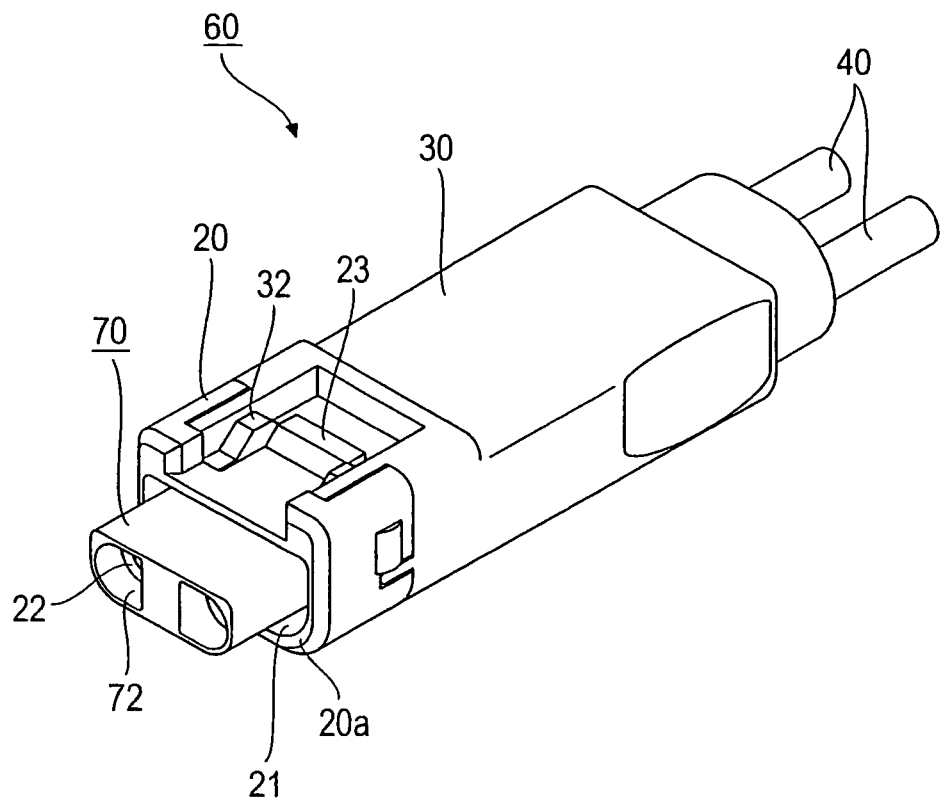
FIG. 1A is a perspective view of an embodiment of the optical plug according to the present invention and FIG. 1B is a perspective view showing the optical plug of FIG. 1A turned upside down.
Figure 1B:
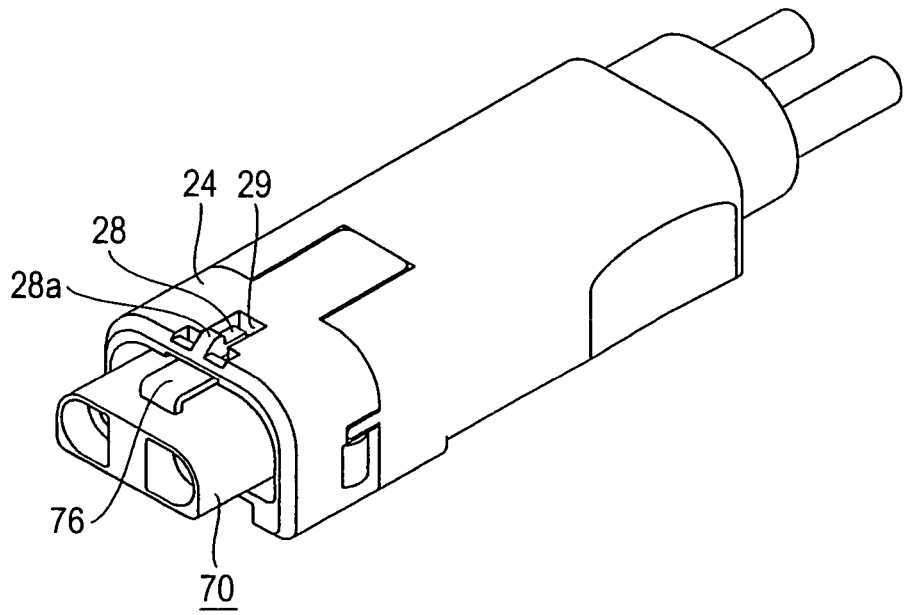

FIGS. 1A and 1B show the external appearance of one embodiment of the optical plug according to the present invention, FIG. 1A is a perspective view of the optical plug as viewed obliquely from above while FIG. 1B shows the optical plug of FIG. 1A turned upside down.

The optical plug 60 in this example includes a body 20 and a tubular cover 30 slidably mounted over the body 20 like the optical plug 10 shown in FIG. 11, but further comprises an additional ferrule cover 70 which is disposed in a recess 21 formed in the front face 20a of the body 20.

Figure 2A:
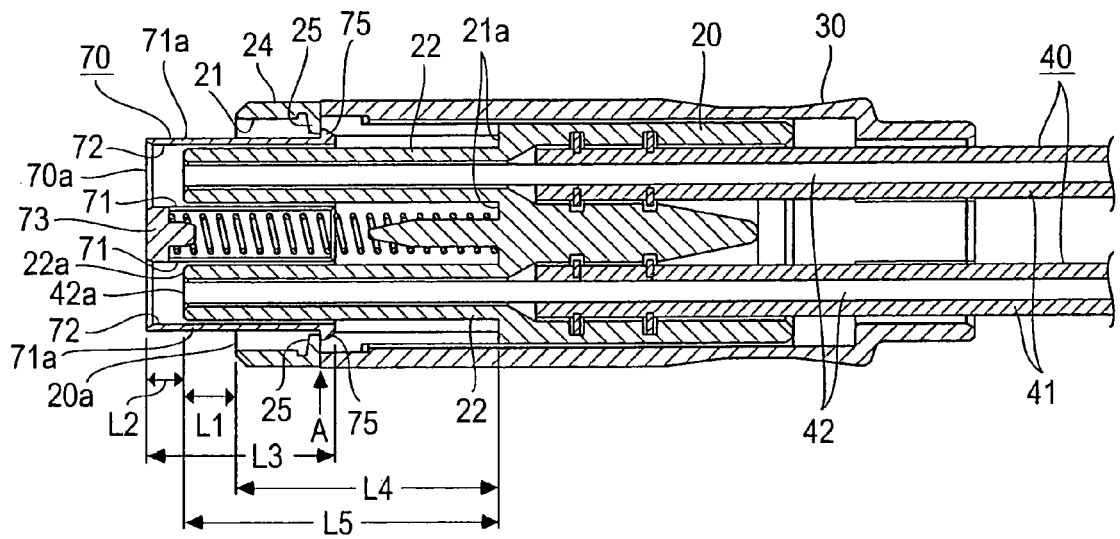
FIG. 2A is a horizontal cross-sectional view of the optical plug taken longitudinally along the central line thereof and FIG. 2B is a vertical cross-sectional view of the optical plug taken longitudinally along the central line thereof.
Figure 2B:
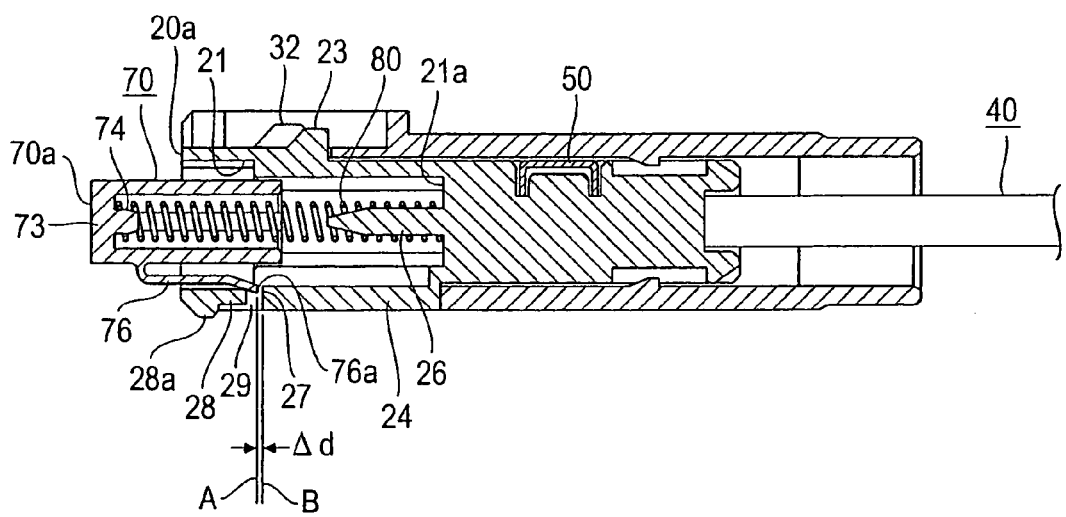
Figure 3:
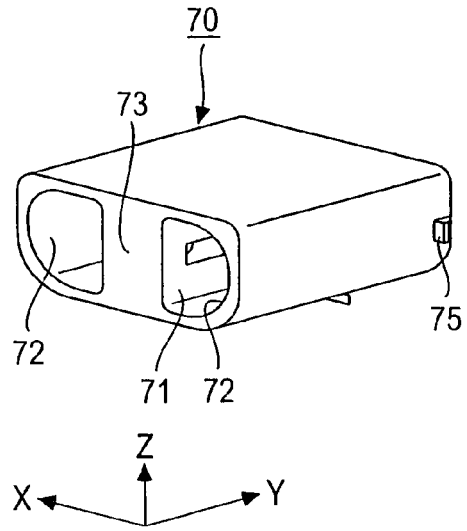
FIG. 3 is a perspective view showing the external appearance of the ferrule cover.

FIGS. 2A and 2B show the cross-sectional construction of the optical plug 60, and FIG. 3 shows the external appearance of the ferrule cover 70. First, the construction of the ferrule cover 70 will be described below.

The ferrule cover 70 is generally in the shape of an oval tube as shown in FIG. 3, and has a pair of partitions 71 therein which cooperate with the peripheral wall 71a of the cover to define a pair of longitudinal accommodating bores 72 open at forward and rearward ends, as shown in FIG. 2A. These accommodating bores 72 are shaped complementarily with a pair of ferrules 22 extending from the body 20 to accommodate the ferrules 22.

The space between the pair of partitions 71 is closed at the forward end of the ferrule cover 70 by a front plate 73 formed in the center of the ferrule cover 70 at its forward end, the front plate 73 having a protrusion 74 extending inwardly from its inner surface. Referring to the orthogonal X-Y-Z axes shown in FIG. 3, when the top and bottom surfaces of the ferrule cover lie in the X-Y plane orthogonal to the Z axis, the pair of partitions 71 and the peripheral wall 71a lie in the Y-Z plane orthogonal to the X axis and the front plate 73 lies in the X-Z plane orthogonal to the Y axis. Further, the longitudinal direction of the ferrule cover refers to the Y-axis direction, the transverse direction refers to the X-axis direction and the vertical direction refers to the Z-axis direction. The end of the ferrule cover where the front plate 73 is disposed is referred to as the forward face of the ferrule cover.

The ferrule cover 70 has pawls 75 extending from its outer periphery on opposite lateral sides thereof at its rear end as shown in FIG. 3 and further has a stop member 76 extending integrally downwardly from the underside surface of its outer periphery as shown in FIG. 2B. The stop member 76 is in the form of an elongate rectangular flap extending rearwardly from the outer periphery and terminating in a rear end slightly bent outwardly (that is, downwardly from the underside surface).

The ferrule cover 70 having the structure described above may be molded in one piece from resin so that the stop member 76 may be resiliently deformable.

Attaching of the ferrule cover 70 to the body 20 may be accomplished by pushing the cover into the recess 21 of the body. When this is done, a coil spring 80 is interposed between the bottom wall 21a of the recess 21 and the front plate 73 so that the ferrule cover 70 is continuously biased by the coil spring 80 forwardly from the bottom wall 21a of the recess 21 toward the front face of the body, whereby the pair of pawls 75 are caught on corresponding locking projections 25 formed on the peripheral wall 24 of the body surrounding the recess 21 as shown in FIG. 2A to be prevented from withdrawal at this withdrawal-preventing position A where the pawls are caught on the locking projections. Thus, the pawls 75 and the locking projections 25 constitute the withdrawal-preventing means. It is to be noted here that a projection 26 extends from the bottom wall 21a of the recess 21 such that the coil spring 80 is positioned in place by this projection 26 and the protrusion 74 from the inner surface of the front plate 73.

The stop member 76 provided on the ferrule cover 70 has a resiliency and is configured such that it extends toward the rear end of the ferrule cover to be received and positioned in the recess 21 with the free end 76a of the stop member 76 resiliently contacting the inner surface of the peripheral wall 24 of the recess 21 and such that upon reaching the aforesaid withdrawal-preventing position A, the free end 76a of the stop member 76 enters in a window 29 formed in the peripheral wall 24 due to its resiliency. In FIG. 2B the location of the free end 76a of the stop member 76 is indicated at the position A when the ferrule cover reaches the withdrawal-preventing position A by means of the biasing force of the coil spring. When the ferrule cover 70 is attempted to be moved in the rearward direction from the withdrawal-preventing position A after it has once reached the withdrawal-preventing position A, the free end 76a of the stop member 76a buts against a shoulder 27 of the window 29 formed in the peripheral wall 24 of the recess 21 of the body 20. The location of the free end 76a of the stop member 76 is indicated at the position B which is referred to as the locking position B. This locking position B may coincide with the aforesaid position A corresponding to the withdrawal-preventing position A. Alternatively, in order to make this locking action more smooth, the locking position B may be modified such that the ferrule cover may be locked where it is moved by a predetermined slightly short length Δd in the rearward direction toward the bottom wall of the recess after reaching the withdrawal-preventing position.

It is thus to be appreciated that by simply pushing the forward face of the ferrule cover 70 in the rearward direction toward the bottom wall of the recess 21 against the biasing force of the spring 80 in an attempt to depress the ferrule cover 70 which is normally forced to be positioned at the withdrawal-preventing position A by the coil spring, the ferrule cover 70 cannot be depressed into the recess 21 rearwardly beyond the locking position B because the end 76a of the stop member 76 is brought into abutment with the shoulder 27.

It should be noted that the longitudinal length L3 of the ferrule cover 70 is made shorter than the length L4 from the front face 20a of the body 20 to the bottom wall 21a of the recess 21 and that the length L5 of the ferrules 22 extending from the bottom wall 21a is made equal to or preferably longer than the length L4 (depth of the recess 21). In this embodiment, the ends 22a of the ferrules 22 project by a length L1 (=L5−L4) forwardly of the front face 20a of the body 20 as is the case with the prior art example.

Further, the longitudinal length L3 of the ferrule cover 70 and the withdrawal-preventing position A are determined such that the forward face 70a of the ferrule cover 70 is positioned forwardly by a distance L2 of the forward ends 22a of the ferrules 22 when the ferrule cover 70 is biased by the coil spring 80 to be held at the withdrawal-preventing position A.

The peripheral wall 24 of the recess 21 is provided at a position opposing the stop member 76 with a hinge 28 which is located in a window 29 formed in the peripheral wall 24 as shown in FIGS. 1B, 2B. The hinge 28 has its forward end integrally supported by the peripheral wall 24 and the rearward end free to be pivoted. It is further to be noted that the hinge 28 has a protrusion 28a extending from its outer surface which protrudes downwardly of the outer surface (underside) of the peripheral wall 24 of the recess 21.

When the optical plug 60 constructed as described above is in the unmated state (not in mating engagement with the receptacle), the ferrules 22 are located in the accommodating bores 72 of the ferrule cover 70 with the forward ends 22a of the ferrules 22 recessed by the distance L2 from the forward face 70a of the ferrule cover 70 so as to protect the forward ends 42a of the optical fibers 42 as shown in FIGS. 1A, 1B and 2A, whereby the forward ends 42a of the optical fibers 42 are not subject to damage. The distance L2 may be appropriately determined.

Figure 4A:
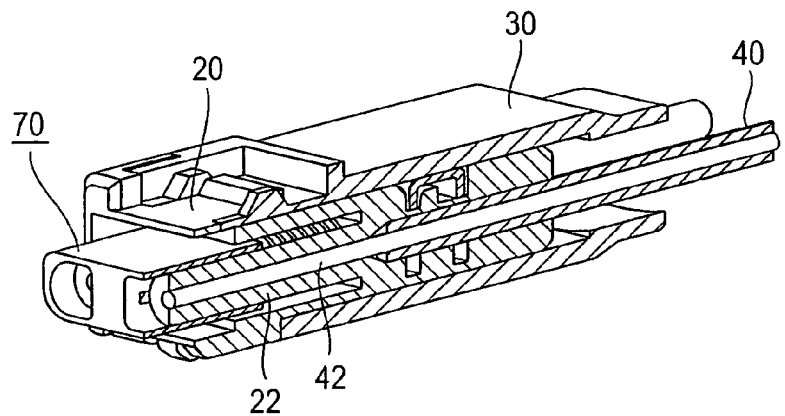
Figure 4B:
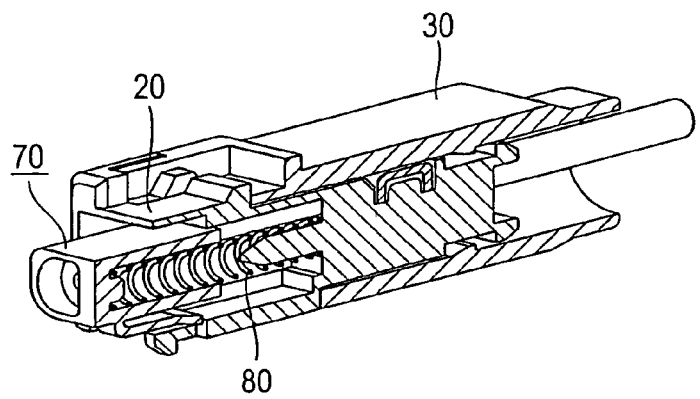

FIGS. 4A and 4B show the cross-section, in perspective views, of the structure of the optical plug in the withdrawal-preventing position shown in FIGS. 2A and 2B. FIG. 4A shows the cross-section of that portion of the optical plug containing the optical fiber 42 while FIG. 4B shows the cross-section of the optical plug 60 taken longitudinally along the central line thereof like FIG. 2B.

Next, how to mate this optical plug 60 with the receptacle will be described.

Figure 5A:
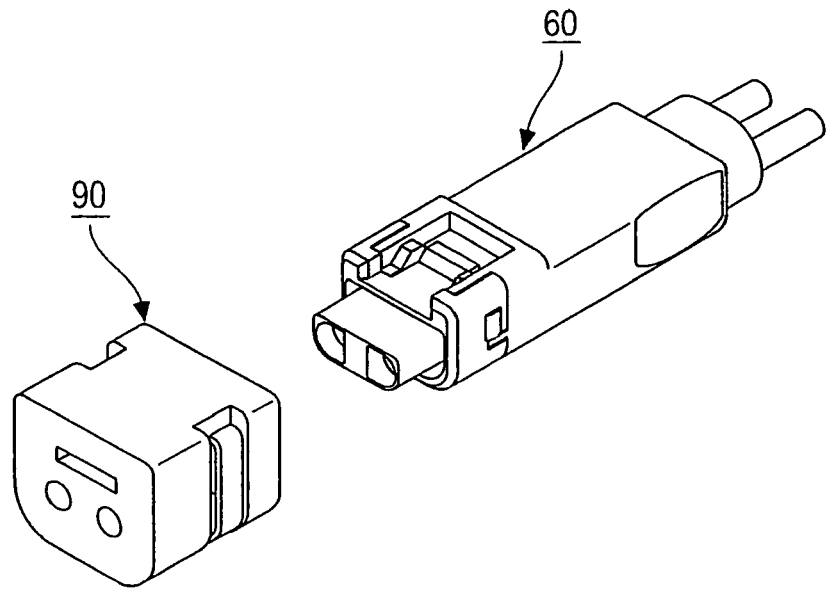
Figure 5B:
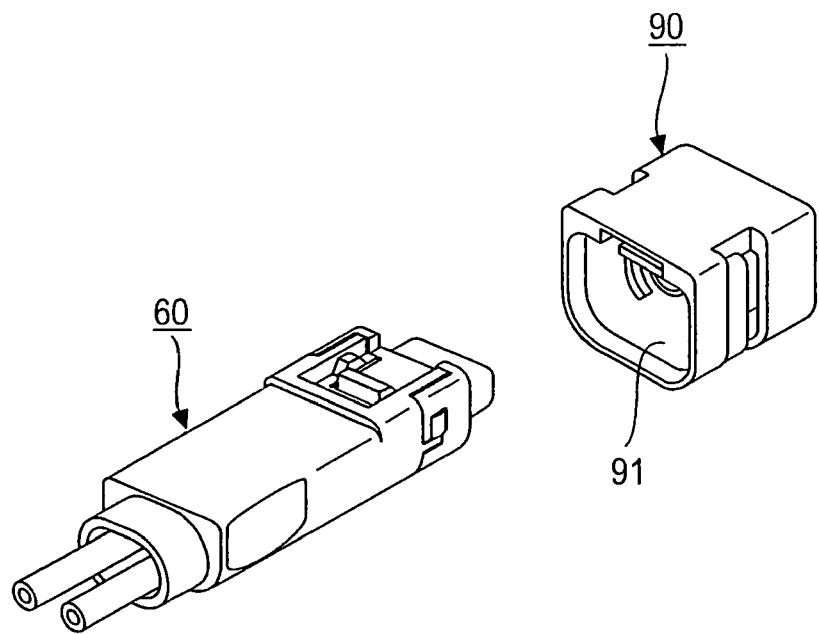

FIGS. 5A and 5B show the optical plug 60 and the receptacle 90 to which the optical plug 60 is mated for optical connection as viewed in opposite directions. The receptacle 90 is partly removed to show only that portion thereof to which the optical plug 60 is mated for connection.

Figure 6A:
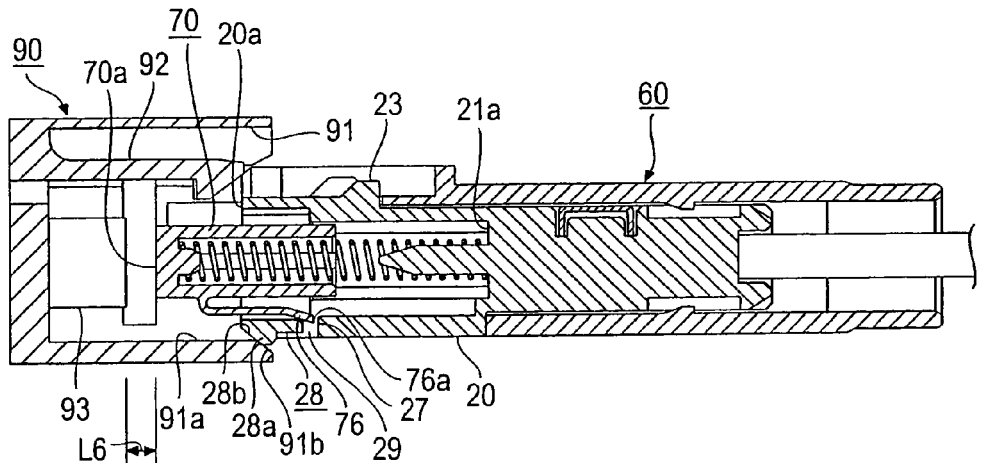
FIG. 6A is a cross-sectional view showing the optical plug being inserted into the receptacle and FIG. 6B is a view illustrating how the hinge and stop member are actuated by the optical plug being inserted into the receptacle.

The receptacle 90 has an opening 91 into which the optical plug 60 is inserted. The receptacle 90 includes a locking piece 92 and sleeves 93 disposed in the opening 91 as shown in FIG. 6A. The locking piece 92 is adapted to engage the locking protrusion 23 provided on the body 20 of the optical plug 60, and the sleeves 93 are adapted to receive and fit over the ferrules 22. In addition, the main cover 30 of the optical plug includes actuator pieces 31 having mountain-like projections 32 formed thereon as in the prior art example so that as the cover 30 is slidingly moved rearwardly along the body 20, the mountain-like projections 32 will lift up the locking piece 92 to dissolve the engagement of the locking piece with the locking protrusion 23.

When the optical plug 60 is positioned in longitudinal opposition to and inserted into the opening 91 of the receptacle 90 as shown in FIG. 6A, the slant surface 28b of the protrusion 28a of the hinge 28 provided on the body 20 comes into abutment with the bevelled surface 91b (see FIG. 6A) of the inner wall 91a of the opening 91 of the receptacle 90. The hinge 28 is urged by the beveled surface 91b as well as the inner wall 91a upwardly to be pivoted as shown in FIG. 6B while the insertion of the optical plug 60 into the receptacle 90 is progressed by a distance L6 from the initial state as shown in FIG. 6A.

Figure 6B:
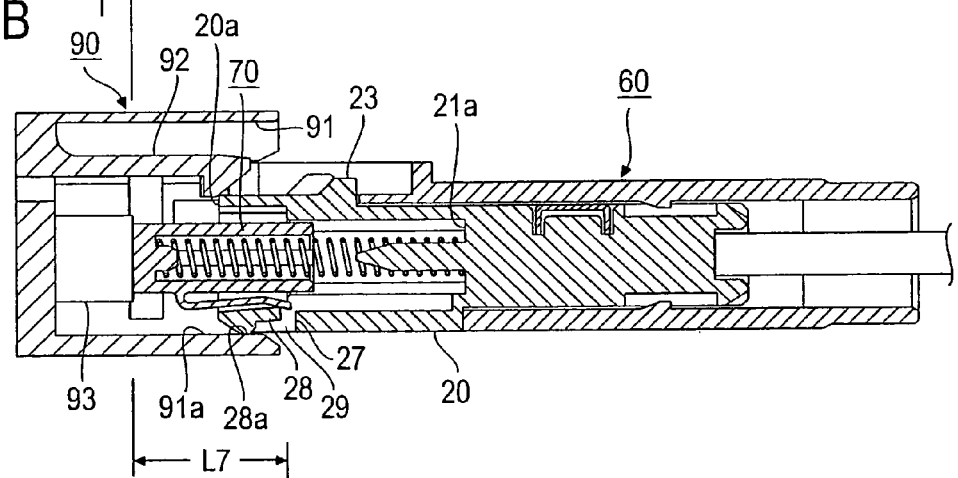

This pivoting of the hinge 28 depresses the stop member 76 of the ferrule cover 70 to urge its free end 76a inwardly out of engagement with the shoulder 27 as shown in FIG. 6B to allow the movement of the ferrule cover 70 in the rearward direction beyond the locking position B. Thus, the hinge 28 serves as releasing means for releasing the locking means.

When once the locking means has been released and when the optical plug 60 is further inserted into the opening 91 of the receptacle 90 to the position shown in FIG. 6B (the distance through which the plug is inserted from the position shown in FIG. 6A to that shown in FIG. 6B is represented by L6), the sleeves 93 come into abutment with the forward face of the ferrule cover 70 and thereafter depress the ferrule cover 70 rearwardly as the plug is further inserted into the receptacle.

Figure 7:
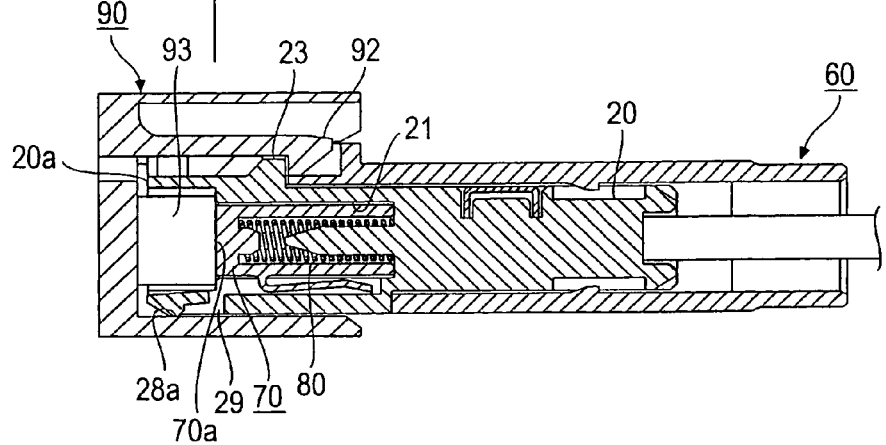
FIG. 7 is a cross-sectional view showing the optical plug and the receptacle mated with each other for optical connection.

FIG. 7 illustrates the ferrule cover 70 as having been thus depressed toward the bottom wall of the recess 21 in the body 20 while the optical plug 60 has been mated with the receptacle 90 for optical connection. As the ferrule cover 70 is displaced inwardly into the recess 21, the ferrules 22 project out of the forward face 70a of the ferrule cover 70 (see FIG. 9) and are inserted into the sleeves 93. It is to be noted that the maximum length L7 through which the ferrules are inserted into the sleeves from the position shown in FIG. 6B to that shown in FIG. 7 is limited by the rear ends of the ferrule cover 70 reaching the bottom wall 21a of the recess 21. Once the plug has been inserted into the receptacle to this position shown in FIG. 7, the locking protrusion 23 is brought into engagement with the locking piece 92 to thereby prevent the optical plug 60 from withdrawal and provide an optical connector having the optical plug 60 maintained in mated connection with the receptacle 90.

It should be particularly noted here that the ferrule cover 70 keeps the ferrules 22 stored therein until the optical plug 60 is inserted into the opening of the receptacle 90, so that the forward ends 22a of the ferrules are inserted into the opening of the receptacle while they are protected by the ferrule cover.

In addition, the forward ends of the ferrules are exposed out of the ferrule cover only when they are inserted into the opening of the receptacle and then they are immediately inserted into the sleeves 93 to complete the mating. When the optical plug is unmated from the receptacle as well, the forward ends of the ferrules are not withdrawn from the opening of the receptacle until after they have been protected by the ferrule cover, so that during the unmating operation the forward ends of the ferrules are maintained in the perfectly protected condition without being exposed to the atmosphere.

Figure 8A:
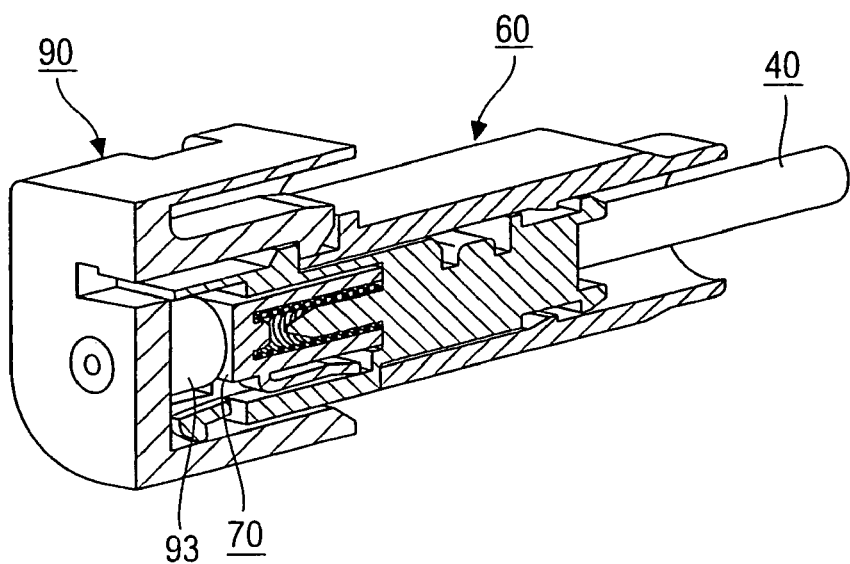
Figure 8B:
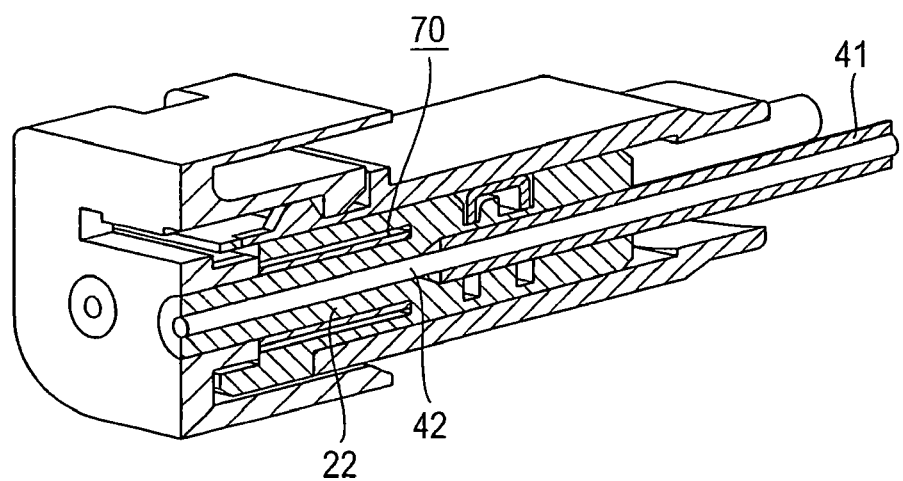

FIGS. 8A and 8B show the cross-section, in perspective views, of the structure of the optical connector with the optical plug 60 and the receptacle 90 in the mated state. FIG. 8A shows the cross-section of the mated optical plug 60 and receptacle 90 taken longitudinally along the central line thereof like FIG. 7 while FIG. 8B shows the cross-section of that portion of the mated plug and receptacle containing the optical fiber 42 and the sleeve 93.

Figure 9:
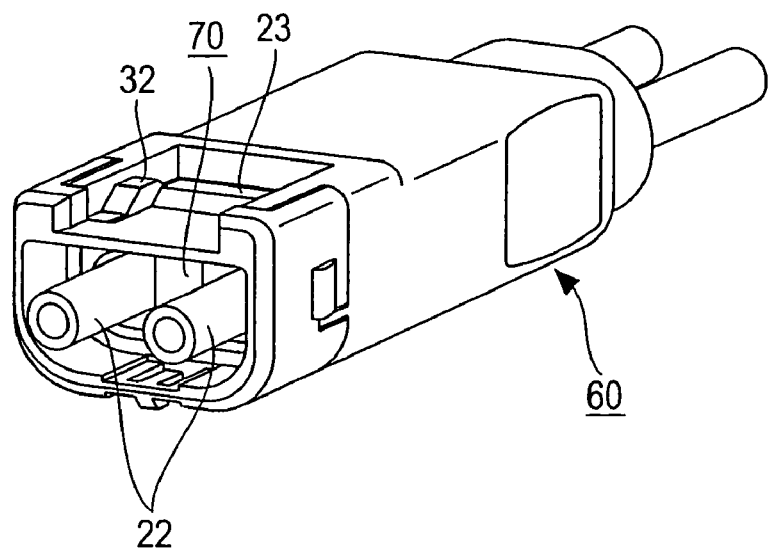
FIG. 9 is a perspective view of the optical plug in the mated state, with the receptacle removed.

FIG. 9 is a perspective view of the optical plug in the mated state showing the ferrule cover 70 being depressed to project the pair of ferrules 22 from the forward face of the ferrule cover, with the receptacle 90 removed.

It is to be understood that while in this embodiment the mountain-like projections 32 formed on the main cover 30 of the optical plug as in the prior art example are illustrated serving as dissolving means for dissolving the engagement between the receptacle 90 and the optical plug 60, such the dissolving means may of course be provided on the side of the receptacle 90.

It is to be noted that upon removing the optical plug 60 from the receptacle 90, both the stop member 76 and the hinge 28 return to their original positions by their own resilient restoring forces and the ferrule cover 70 is also restored to the original position for protecting the ferrules by the resilient restoring force of the coil spring 80. It will thus be appreciated that the ferrules of the optical plug 60 as removed from the receptacle are always protected by the ferrule cover 70.

As discussed above, according to the illustrated embodiment of this invention, the optical plug is configured such that upon mating with the receptacle 90, the ferrule cover 70 is depressed and displaced rearwardly by the sleeves 93 of the receptacle 90 to project the ferrules 22 to allow them to be inserted into the sleeves 93. Such displacement of the ferrule cover 70 and the concurrent projection of the ferrules 22 are permitted by the hinge 28 provided on the body 20 of the optical plug 60 being depressed by the inner wall 91a to thereby unlock the stop member 76 which is the locking means for the ferrule cover. While it is convenient that the arrangement be such that the hinge serving as the releasing means for releasing the locking means for the ferrule cover is automatically actuated only by inserting the body 20 of the optical plug 60 into the opening 91 of the receptacle 90, it is needless to say that the arrangement may be such that the releasing means could be manually actuated by the operator.

At any rate, unless the locking means is released by the use of the releasing means, hence except when the optical plug is mated into the receptacle, the ferrule cover 70 cannot move rearwardly (depressed into the recess toward the bottom wall thereof) by simply pushing the forward face of the ferrule cover. In other words, the ferrules 22 are maintained in the protected condition to thereby insure protection of the forward ends 42a of the optical fibers 42.

Figure 10:
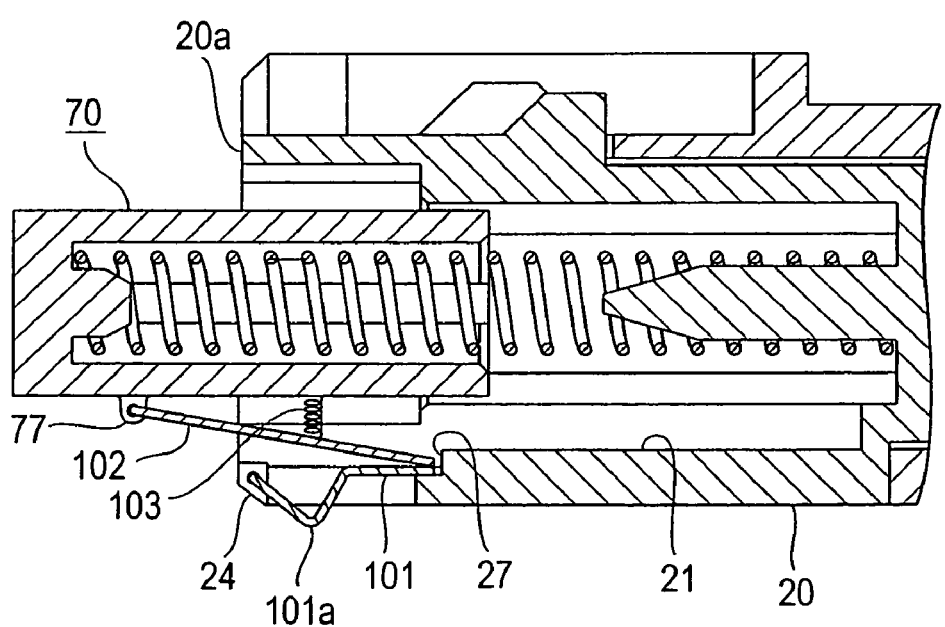
FIG. 10 is a cross-sectional view showing the principal portions of a second embodiment of the receptacle according to the present invention.

FIG. 10 shows the principal portions of a second embodiment of the present invention in which the hinge and stop member are not formed integrally with the body 20 and the ferrule cover 70, respectively unlike the embodiment described above, but are separate parts constructed of metal plates.

In this embodiment, the hinge 101 is bent as shown in FIG. 10 so as to form a protrusion 101a intermediate its opposite ends and has the end adjacent the protrusion 101a pivotally supported on the peripheral wall 24 surrounding the recess 21 of the body 20 by means of a shaft/hole connection and the other end bearing on the inner surface of the peripheral wall 24.

The stop member 102 is pivotally supported at one end on a support portion extending from the outer periphery of the ferrule cover 70 like the hinge 101 and has its other free end urged against the hinge 101 by a coil spring 103 interposed between the middle portion of the stop member 102 and the outer periphery of the ferrule cover 70. The other free end of the stop member 102a buts against the shoulder 27 of the window 29 formed in the peripheral wall 24 of the recess 21 of the body 20.

With the hinge 101 and the stop member 102 constructed as described above, the hinge 101 and stop member 102 will act as in the previously described embodiment, that is, they constitute a lock mechanism for the ferrule cover. The metal plate of which the hinge 101 and the stop member 102 are made may be stainless steel or phosphor bronze, for example.

As discussed above, it is to be appreciated that the optical plug according to the present invention is provided with the ferrule cover and may prevent possible damages to the forward ends of the optical fibers since the ferrules of the plug are stowed in the ferrule cover to protect the optical fiber ends when the plug is in the unmated state.

Further, in this unmated state, the movement of the ferrule cover is prevented by the stop member, that is, the ferrule cover is not allowed to be depressed even if a pushing force is applied thereto until upon the plug being inserted into the receptacle to thereby unlock the stop member, the ferrule cover is made free to move whereby the ferrules are projected out of the ferrule cover as the latter is depressed by the sleeves. This arrangement insures the protection of the optical fiber ends.

It is thus to be understood that the present invention eliminates the need for the troublesome operation of attaching and detaching a protective cap as is the case with the prior art, thereby provides a very wieldy optical plug.

In addition, because no separate protective cap is required, there is no fear of swallowing such protective cap erroneously, nor is there involved the problem of losing such cap. In this respect as well, the optical plug of this invention is easy to handle. Due to such easiness to handle, the optical plug of this invention is very suitable for use for the next generation of household electrical information appliances such as those which utilize optical fibers to transmit and receive signals.

Moreover, the optical connector comprising a combination of the optical plug according to the present invention and a receptacle provides the remarkable advantage of eliminating the need for giving attention to the protection of the forward ends of the ferrules, because during the mating operation, move operation of the ferrule cover is performed within the opening of the receptacle to allow the ferrules to project out of the ferrule cover to thereby permit the sleeves to fit over the projected ferrules by simply abutting the optical plug and the receptacle to each other and inserting the optical plug into the opening of the receptacle and after the optical plug has been unmated from the receptacle as well, the ferrules of the optical plug are stored and protected within the ferrule cover.

What is claimed is:

1. An optical plug usable in engagement with a receptacle, comprising:
   an optical plug body having a recess formed in its front face opposing to said receptacle and ferrules formed to extend from a bottom wall of said recess such that forward free ends of said ferrules are flush with or protrude forwardly of the front face of said body;
   optical fibers inserted into said ferrules such that forward ends of said fibers are flush with and exposed at the forward ends of said ferrules;
   a ferrule cover mounted in said recess capable of sliding movement along outer periphery of said ferrules in both a forward direction from the bottom wall of the recess toward the front face of said body and a forward direction opposite to the forward direction;
   spring means for urging said ferrule cover to move in the forward direction from the bottom wall of said recess;
   withdrawal-preventing means for preventing said ferrule cover from its movement in the forward direction beyond a predetermined withdrawal-preventing position when said ferrule cover is urged to move in the forward direction by said spring means;
   locking means for preventing said ferrule cover from its movement in the rearward direction toward the bottom wall of said recess beyond a locking position which coincides with said withdrawal-preventing position or which is near said withdrawal-preventing position when said ferrule cover is urged to move in the rearward direction from said withdrawal-preventing position toward the bottom wall of said recess against a biasing force of said spring means, so that a forward face of said ferrule cover is positioned forwardly of the forward ends of the ferrules while the ferrule cover is positioned at the withdrawal-preventing position or the locking position to thereby protect the forward ends of the ferrules; and
   releasing means for releasing the locking action of said locking means so that said ferrule cover is allowed to move in the rearward direction beyond the locking position in said recess toward the bottom wall thereof, whereby the forward ends of said ferrules are exposed out of the forward face of said ferrule cover.

2. The optical plug set forth in claim 1, wherein said locking means comprises:
   a stop member having one end thereof formed integrally with the ferrule cover, and the other free end thereof extending towards a rear end of the ferrule cover and protruding from an outer periphery of said ferrule cover so that the other free end of the stop member can engage with an inner surface of the peripheral wall of said recess when the ferrule cover is mounted in the recess; and
   a shoulder formed at a window in the peripheral wall of said recess for allowing the other free end of said stop member to engage therewith when the ferrule cover is urged to move in the rearward direction from the withdrawal-preventing position.

3. The optical plug set forth in claim 2, wherein said releasing means comprises:
   a hinge having one end thereof formed integrally with the peripheral wall of said recess, a protrusion projecting outwardly beyond an outer surface of said peripheral wall of the recess, and the other free end thereof positioned in the window of the peripheral wall of the recess,
   said hinge being adapted to position in opposing relation with said stop member when the ferrule cover is positioned at the withdrawal-preventing position, and to release the engagement of said stop member with said shoulder by its free end in response to depression of the protrusion inwardly of the outer surface of the peripheral wall of said recess.

4. The optical plug set forth in claim 1, wherein said locking means comprises:
   a stop member having one end thereof pivotally connected to an outer periphery of said ferrule cover and the other free end thereof extending towards a rear end of said ferrule cover;
   a spring for biasing said stop member in such a direction as to cause said other free end to protrude out of an outer periphery of said ferrule cover so that the other free end of the stop member can engage with an inner surface of the peripheral wall of said recess when the ferrule cover is mounted in the recess; and a shoulder formed at a window in the peripheral wall of said recess for allowing the other free end of said stop member to engage therewith when the ferrule cover is urged to move in the rearward direction from the withdrawal-preventing position.

5. The optical plug set forth in claim 4, wherein said releasing means comprises:

a hinge member having one end thereof pivotally connected to the peripheral wall of said recess, a protrusion projecting outwardly beyond an outer surface of said peripheral wall of the recess, and the other free end thereof positioned in said window of the peripheral wall of the recess, and said hinge member is adapted to position in opposing relation with said stop member when the ferrule cover is positioned at the withdrawal-preventing position, and to release the engagement of said stop member with said shoulder by the other free end in response to depression of the protrusion inwardly of the outer surface of the peripheral wall of said recess.

6. An optical connector comprising:

an optical plug as in any of the preceding claims;

a receptacle adapted to mate with said optical plug; and connecting means for connecting said optical plug and said receptacle with each other;

wherein said receptacle having an opening for receiving the body of the optical plug to be inserted therein includes:

sleeves formed in said opening for mating with the ferrules of the optical plug; and moving means adapted to be engaged with said ferrule cover for moving said ferrule cover along the ferrules of said optical plug in the rearward direction in said recess toward the bottom wall thereof when the body of said optical plug is inserted into said opening and said releasing means of the optical plug is actuated, whereby the forward ends of said ferrules are exposed to project forwardly of the forward face of said ferrule cover, and in accordance with insertion of the body of said optical plug into said opening said sleeves are mated over the thus projected forward ends of said ferrules.

7. The optical connector set forth in claim 6, wherein:

a part of an inner wall of said opening of said receptacle serves as actuating means for actuating the releasing means of said optical plug when the body of said optical plug is inserted into said opening of the receptacle;

said sleeves serve as the moving means so that the sleeves engage with said ferrule cover and move said ferrule cover in the rearward direction toward the bottom wall of said recess when the body of said optical plug is inserted into said opening, and said connecting means is actuated to engage said optical plug and said receptacle with each other when said sleeves are mated over the thus projected forward ends of said ferrules to a desired amount of mating.

8. The optical connector set forth in claim 7, wherein said connecting means comprises:

a locking protrusion provided to the body of said optical plug;

a locking piece provided to said receptacle which is brought into engagement with said locking protrusion when the body of said optical plug is inserted into the opening of said receptacle such that said sleeves and said ferrules are mated to each other to a desired amount of mating.

9. The optical connector set forth in claim 8, which further comprises dissolving means for inactivating the connecting means to thereby dissolve the engagement between said optical plug and said receptacle.

10. The optical connector set forth in claim 6, wherein said connecting means comprises:

a locking protrusion provided to the body of said optical plug;

a locking piece provided to said receptacle which is brought into engagement with said locking protrusion when the body of said optical plug is inserted into the opening of said receptacle such that said sleeves and said ferrules are mated to each other to a desired amount of mating.

11. The optical connector set forth in claim 10, which further comprises dissolving means for inactivating the connecting means to thereby dissolve the engagement between said optical plug and said receptacle.

* * * * *